(12) United States Patent
Huang

(10) Patent No.: US 8,550,471 B2
(45) Date of Patent: Oct. 8, 2013

(54) TOOL BIT HOLDER

(75) Inventor: Ping-Wen Huang, Taichung (TW)

(73) Assignee: New Way Tools Co., Ltd., Taichung (TW)

( * ) Notice: Subject to any disclaimer, the term of this patent is extended or adjusted under 35 U.S.C. 154(b) by 561 days.

(21) Appl. No.: 12/844,868

(22) Filed: Jul. 28, 2010

(65) Prior Publication Data

US 2012/0025474 A1 Feb. 2, 2012

(51) Int. Cl.
  *B23B 31/107* (2006.01)
(52) U.S. Cl.
  USPC .................. 279/30; 279/22; 279/75; 279/905
(58) Field of Classification Search
  USPC .................. 279/22, 30, 74, 75, 904, 905, 155
  See application file for complete search history.

(56) References Cited

U.S. PATENT DOCUMENTS

| | | | | | |
|---|---|---|---|---|---|
| 1,468,732 | A | * | 9/1923 | Bradbury | 285/277 |
| 3,622,169 | A | * | 11/1971 | Koch et al. | 279/76 |
| 3,735,993 | A | * | 5/1973 | Seibert | 279/75 |
| 3,927,893 | A | * | 12/1975 | Dillon et al. | 279/75 |
| 3,947,047 | A | * | 3/1976 | Hultman | 279/75 |
| 4,629,375 | A | * | 12/1986 | Lieser | 408/239 R |
| 6,199,872 | B1 | * | 3/2001 | Hasan | 279/30 |
| 6,457,916 | B2 | | 10/2002 | Wienhold | 409/240 |
| 6,543,959 | B1 | * | 4/2003 | Jore | 403/322.2 |
| 6,561,523 | B1 | | 5/2003 | Wienhold | 279/30 |
| 6,953,196 | B1 | * | 10/2005 | Huang | 279/75 |
| 6,973,858 | B2 | * | 12/2005 | Huang | 81/177.85 |
| 7,086,313 | B2 | * | 8/2006 | Cantlon | 81/438 |
| 7,243,922 | B2 | * | 7/2007 | Gibbons | 279/62 |
| 8,262,097 | B2 | * | 9/2012 | Lai | 279/74 |
| 2006/0022416 | A1 | * | 2/2006 | Chen | 279/74 |
| 2006/0049587 | A1 | * | 3/2006 | Cornwell | 279/75 |
| 2006/0145431 | A1 | * | 7/2006 | Chang | 279/74 |
| 2011/0049816 | A1 | * | 3/2011 | Hsu | 279/30 |

* cited by examiner

*Primary Examiner* — Eric A Gates
*Assistant Examiner* — Paul M Janeski
(74) *Attorney, Agent, or Firm* — Alan Kamrath; Kamrath IP Lawfirm, P.A.

(57) ABSTRACT

A tool bit holder includes a sleeve, a hub, and a locking mechanism. The sleeve is moveably mounted on an outer periphery of the hub and includes a first notch, a second notch, and an abutting section. The abutting section is disposed between the first and second notches. The locking mechanism is disposed in a cavity defined in the outer periphery of the hub and is retained therein by the sleeve. Also, the locking mechanism includes a control member, a resilient member, and a detent. The control member is moveably disposed in the cavity and is biased by the resilient member. The detent is carried by the control member.

20 Claims, 16 Drawing Sheets

TOOL BIT HOLDER

BACKGROUND OF THE INVENTION

1. Field of the Invention

The present invention relates to a tool bit holder and, in particular, to a tool bit holder that can secure and release a tool bit quickly. Additionally, the user can operate the tool bit holder in one hand to secure and release the tool bit.

2. Description of the Related Art

In many situations, the user has to frequently change tool bits while working on a particular project. Often, the user is in a position where exchanging one tool bit for another is awkward, and it is usually required to use both hands to perform an exchange. Because of the awkwardness inherent in exchanging tool bits in such tool bit holders, the user's work is slowed.

Several tool bit holders have been designed to reduce the awkwardness inherent in exchanging tools in a tool bit holder. U.S. Pat. Nos. 6,457,916 and 6,561,523 are examples. However, it is still desirable to provide a tool bit holder that has a simpler structure and includes components that can be assembled easily for the purpose of saving time and cost.

The present invention is, therefore, intended to obviate or at least alleviate the problems encountered in the prior art.

SUMMARY OF THE INVENTION

According to the present invention, a tool bit holder including a sleeve includes a hole extending therethrough, with the hole delimited by an inner periphery thereof. The sleeve further includes a first notch, a second notch, and an abutting section extending on the inner periphery, with the abutting section disposed between the first and second notches. A hub receives the sleeve, with the sleeve moveably mounted on an outer periphery thereof. The hub further includes a bore extending therein, a cavity defined in the outer periphery thereof, a passage extending from the bore to the cavity to enable them communicate with each other, and a guiding edge defined on the cavity. A locking mechanism is disposed and retained in the cavity by the sleeve. The locking mechanism includes a control member, a resilient member, and a detent. The control member is moveably disposed in the cavity and is biased by the resilient member. The detent is carried by the control member. The abutting section abuts against the detent and causes it to partially expose in the bore.

When in use of the tool bit holder to engage with the tool bit, the detent is urged by the tool bit, and the control member is caused to move and carry the detent in a first direction. The detent is disengaged from the abutting section and is urged into the first notch of the sleeve thereafter. The control member is biased in a second direction and urges the detent to engage in an engaging recess of the tool bit thereafter for securing the tool bit.

However, in order to release the tool bit, the sleeve is moved with respect to the hub, and the detent is disengaged from the abutting section and urged into the second notch of the sleeve thereafter.

It is an object of the present invention to provide a tool bit holder having a simple structure and components which can be assembled easily for the purpose of saving time and cost.

It is another object of the present invention to provide a tool bit holder that can secure and release a tool bit quickly.

It is a further object of the present invention to provide a tool bit holder that the user can operate in one hand to secure and release a tool bit.

Other objects, advantages, and new features of the present invention will become apparent from the following detailed description of the invention when considered in conjunction with the accompanied drawings.

DETAILED DESCRIPTION OF THE PREFERRED EMBODIMENTS

Figure 1:
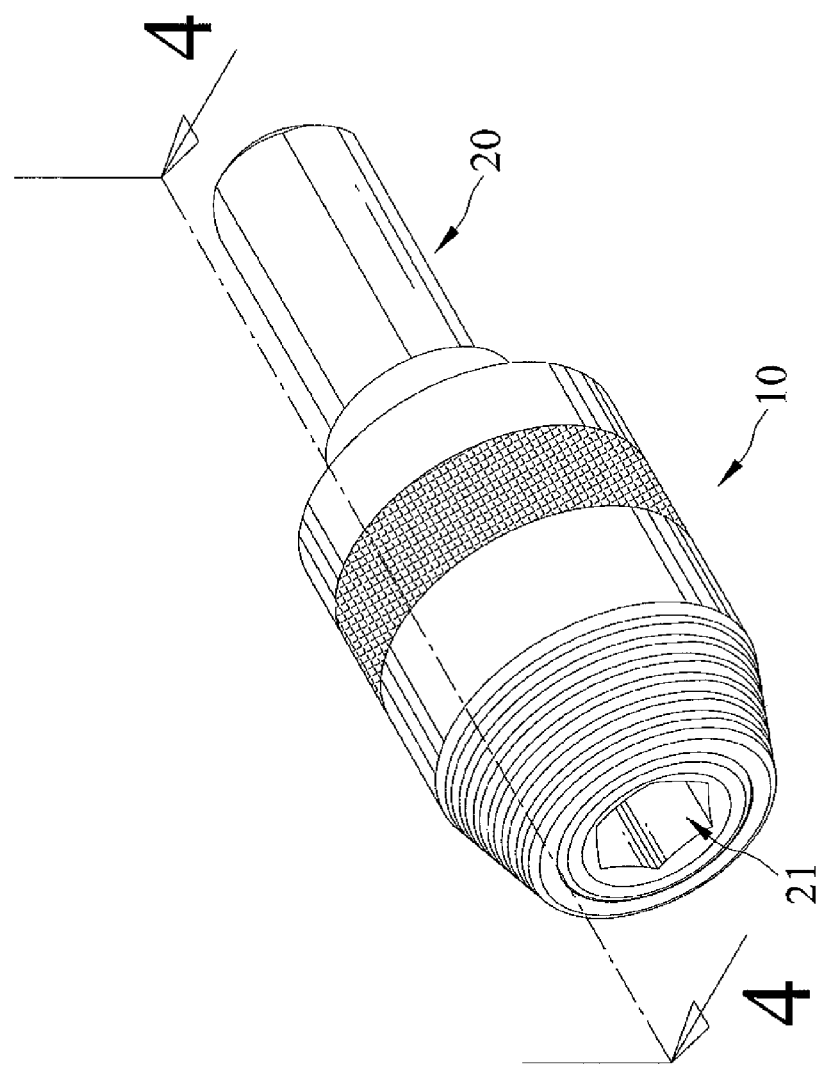
FIG. 1 is a perspective view of a tool bit holder in accordance with a first embodiment of the present invention.
Figure 2:
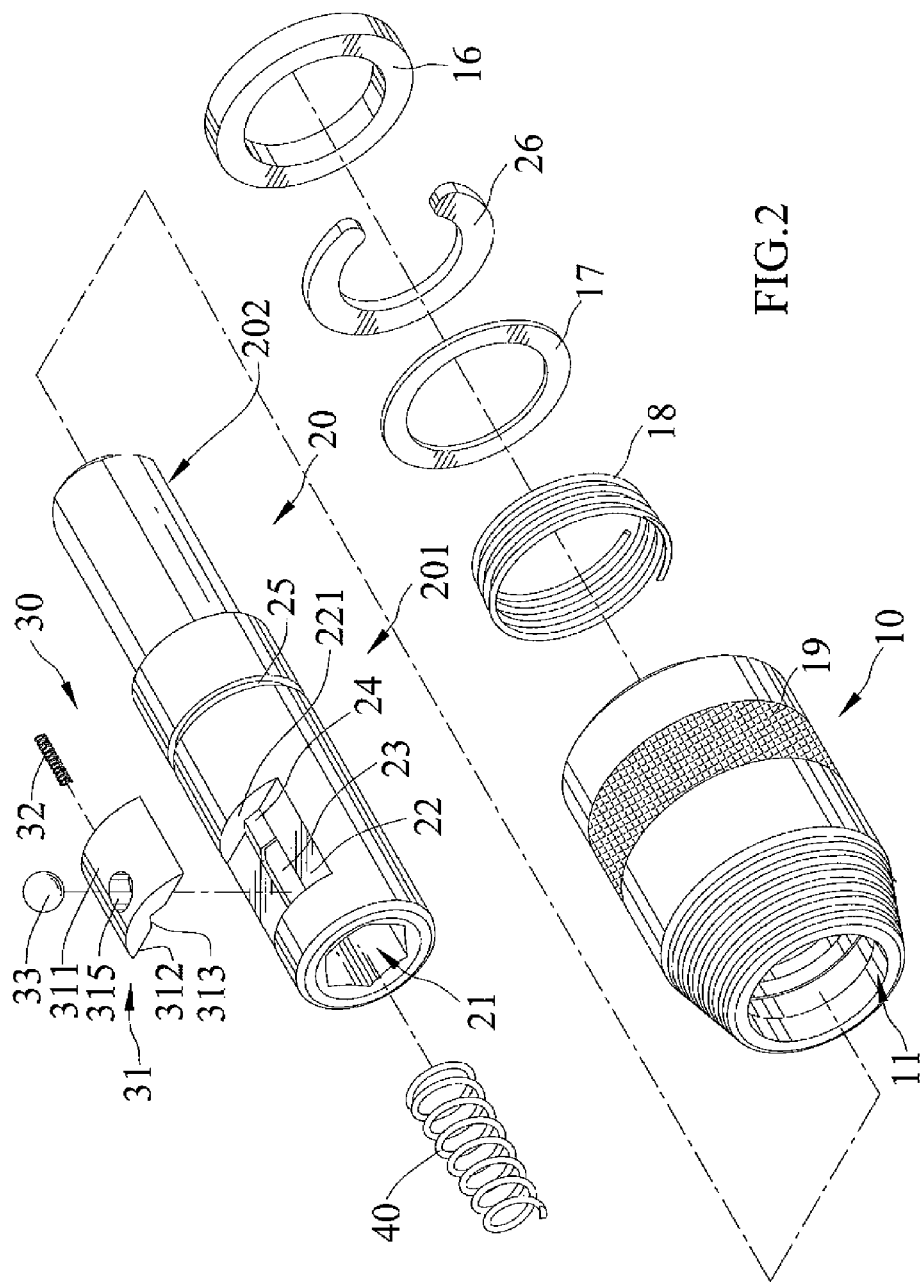
FIG. 2 is an exploded perspective view of the tool bit holder shown in FIG. 1.
Figure 3:
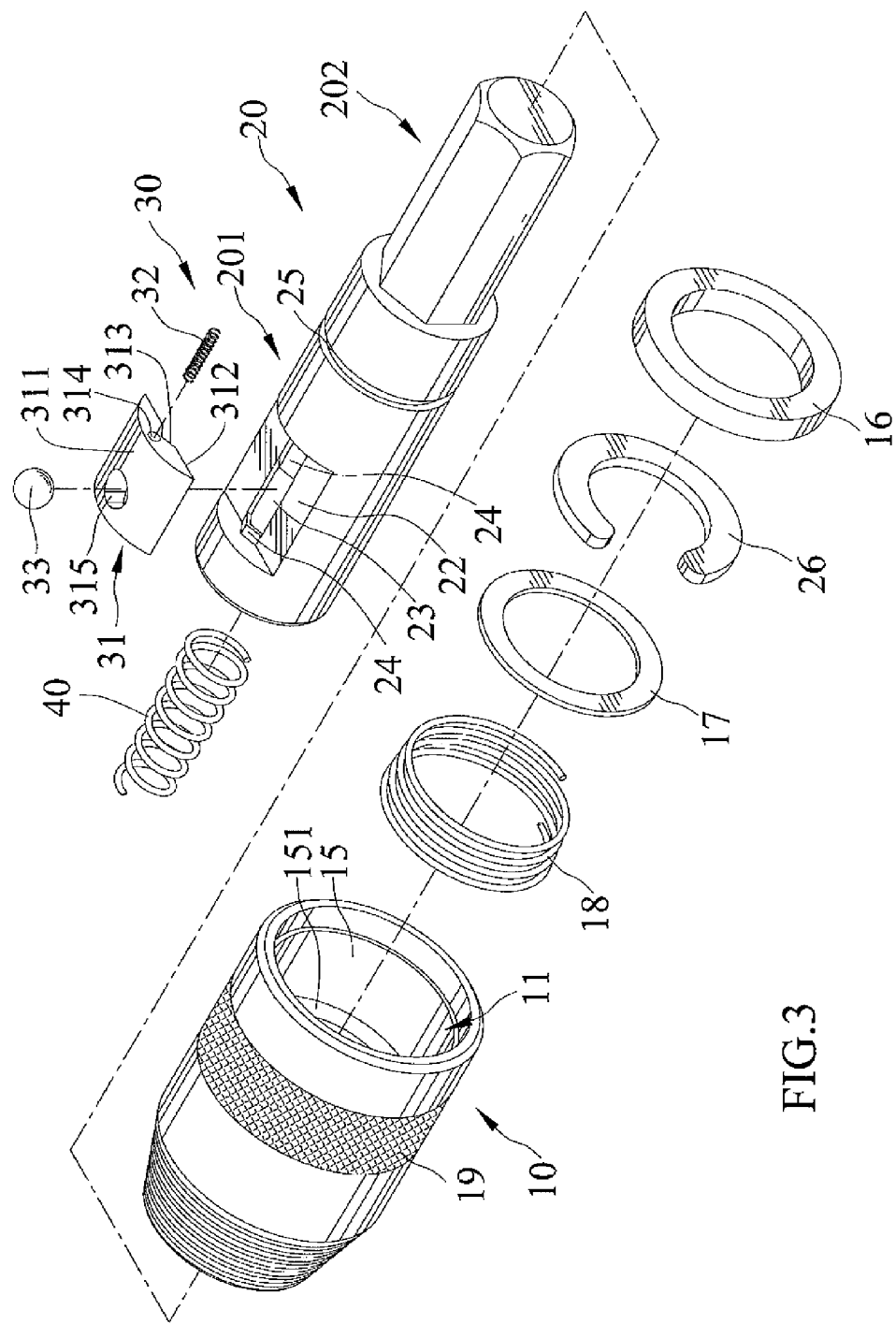
FIG. 3 is another exploded perspective view of the tool bit holder shown in FIG. 1.

FIGS. 1 through 13 show a tool bit holder that can secure and release a tool bit 1 quickly in accordance with a first embodiment of the present invention. The tool bit holder includes a sleeve 10, a hub 20, and a locking mechanism 30. The sleeve 10 is movably mounted on an outer periphery of the hub 20. The locking mechanism 30 is retained on the outer periphery of the hub 20 by the sleeve 10.

The sleeve 10 includes a hole 11 extending therethrough such that it defines a first open end and a second open end. The hole 11 is delimited by an inner periphery of the sleeve 10 and includes two ends including a first end 111 adjacent to the first open end of the sleeve 10 and a second end 112 adjacent to the second open end of the sleeve 10, respectively. Also, the hole 11 defines a compartment 15 in the second end 112 thereof. The compartment 15 extends in the sleeve 10 from the second open end thereof to the first open end thereof and terminates before the first open end thereof such that it includes a terminal end 151 disposed between the first and second open ends of the sleeve 10. The sleeve 10 further includes a first notch 12, a second notch 13, and an abutting section 14 extending circumferentially on the inner periphery of the sleeve 10. The first notch 12, the second notch 13 and the abutting section 14 are defined at the first end 111 of the hole 11, with the abutting section 14 disposed between the first and second notches 12 and 13. Also, the first notch 12, the second notch 13, and the compartment 15 are spaced from one another axially and do not communicate with one another. Moreover, the sleeve 10 includes an anti-slip surface 19 defined on an outer periphery thereof for allowing the user to gain a satisfactory grasp during the operation thereof.

The hub 20 includes a first body 201 and a second body 202 extending from the first body 201. The first and second bodies 201 and 202 are connected to and axially aligned with each other. Also, the first body 201 has a cross section different from that of the second body 202, with the first body 201 being of a circular cross section, and with the second body 202 being of a hexagonal cross section. Additionally, the sleeve 10 is particularly mounted on the first body 201 of the hub 20. The hub 20 further includes a bore 21 extending in the first body 201. The first body 201 includes two opposing distal ends, i.e. a first distal end and a second distal end, and the bore 21 extends from the first distal end axially towards the second distal end and terminates before the second distal end. Furthermore, the bore 21 defines a first section 211 adjacent to the second distal end of the first body 201 and a second section 212 extending from the first section 211 to the first distal end of the first body 201. The first section 211 is of a polygonal cross section and, in particular, a hexagonal cross section. Additionally, the second body 202 is connected to the second distal end of the first body 201. Further, a cavity 22 is defined in the outer periphery of the hub 20 and, in particular, in the first body 201 thereof. The cavity 22 includes two opposing stopping edges 221 and extends longitudinally between the two stopping edges 221. Also, the cavity 22 extends laterally and includes two opposing lateral edges defined on the circumference of the outer periphery of the hub 20. Further, a passage 23 extends radially from the bore 21 to the cavity 22 to enable them to communicate with each other. Further, a wall that forms a boundary between the bore 21 and the cavity 22 includes a guiding edge 24 defined thereon. The guiding edge 24 is V-shaped and includes two sloped surfaces angled with each other and an apex defined at a connection of the two sloped surfaces. Additionally, the passage 23 is extended through the middle of the guiding edge 24. Moreover, the hub 20 includes a groove 25 defined on the outer periphery thereof, and, in particular, the groove 25 is defined in the first body 201 thereof.

Figure 4:
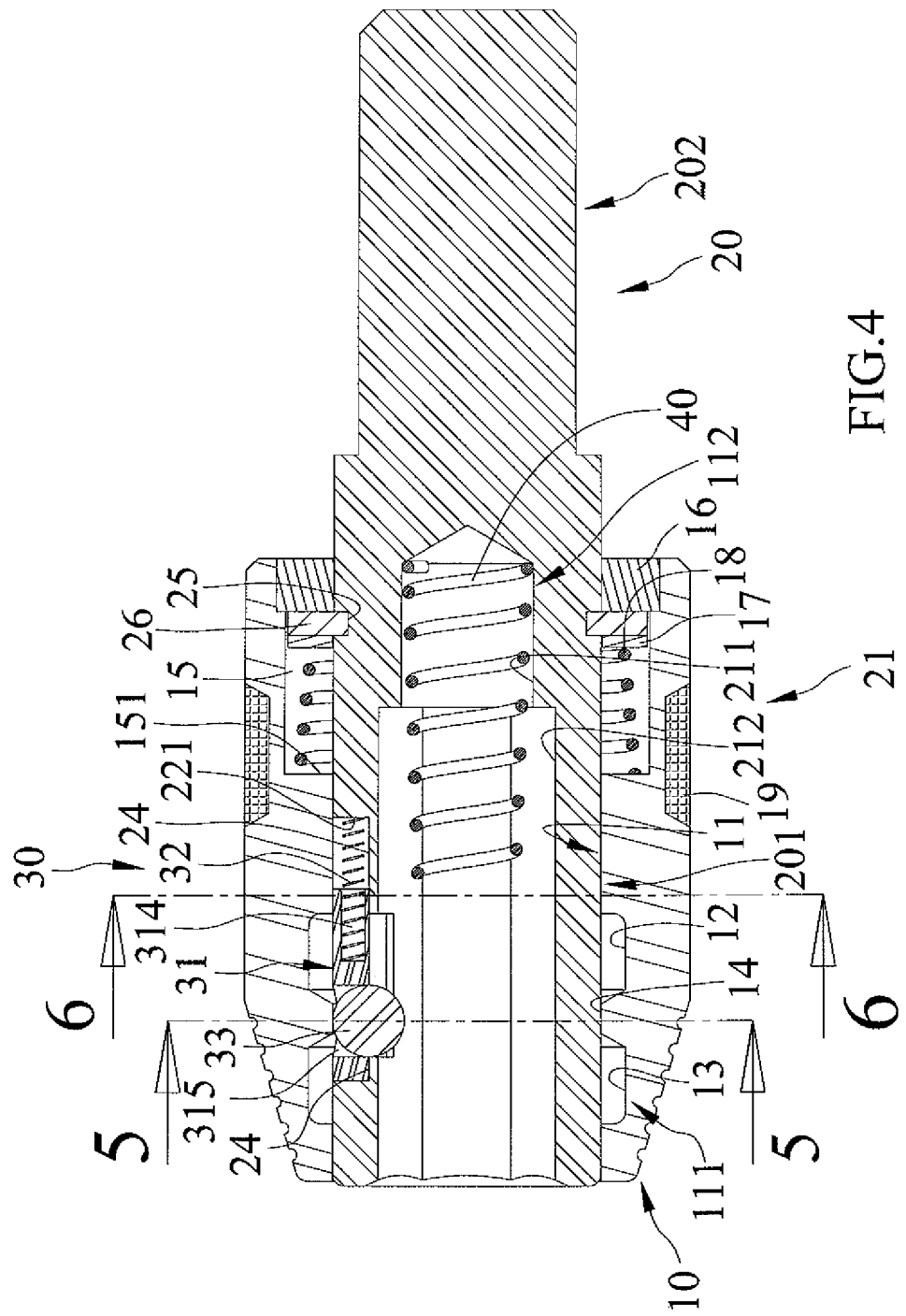
FIG. 4 is a cross-sectional view taken along line 4-4 of FIG. 1.
Figure 5:
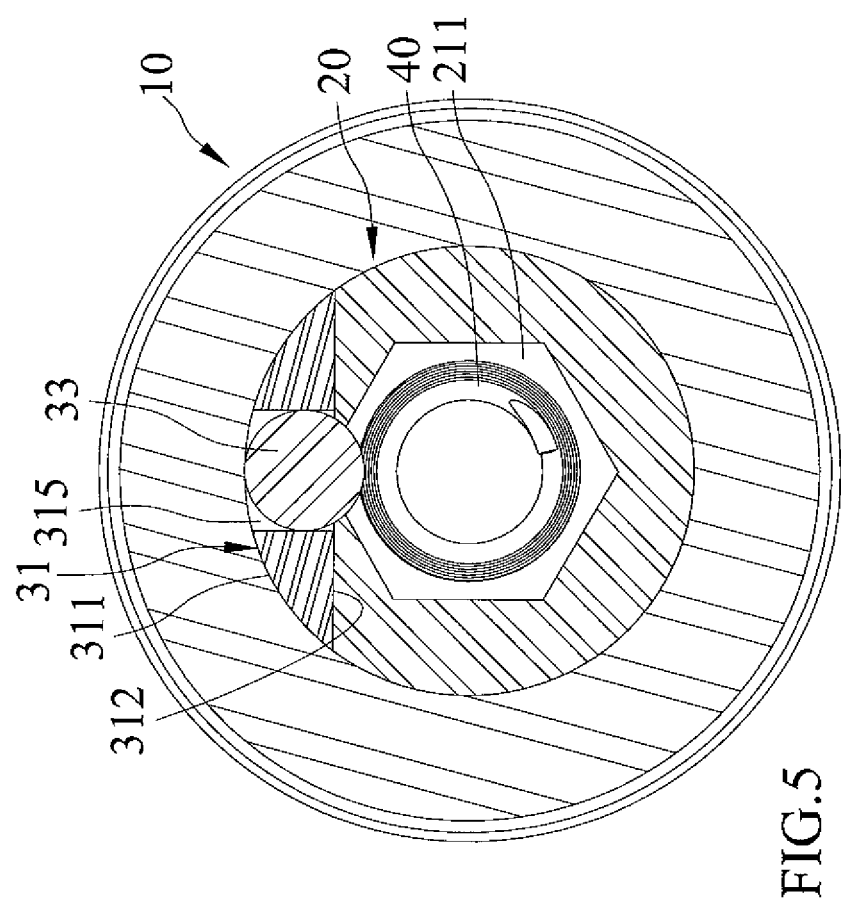
FIG. 5 is a cross-sectional view taken along line 5-5 of FIG. 4.
Figure 6:
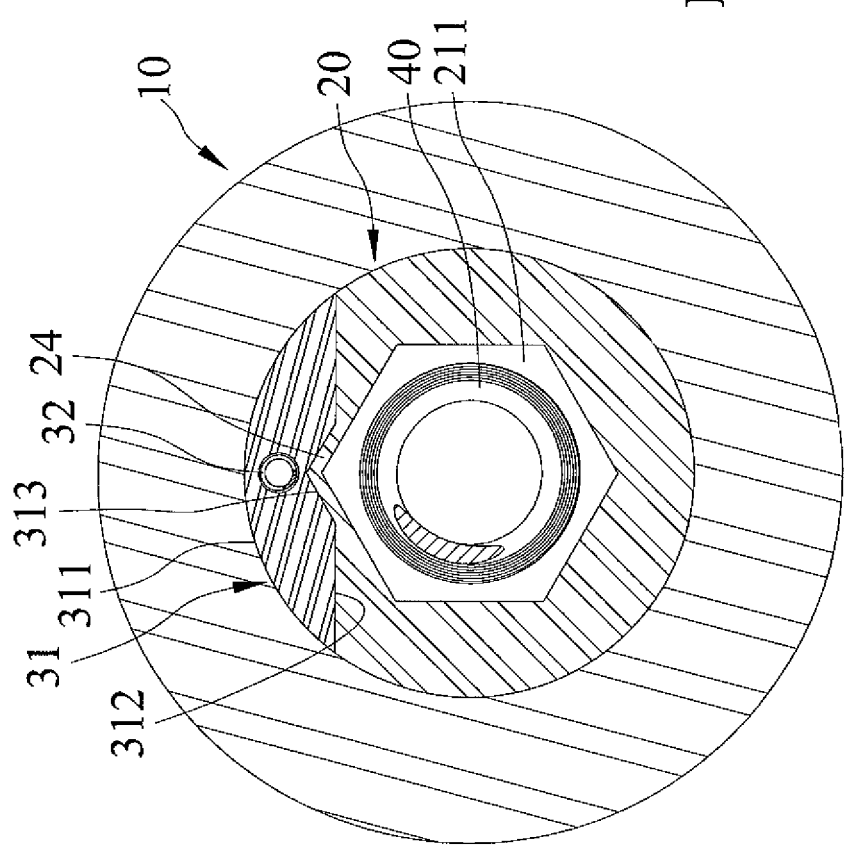
FIG. 6 is a cross-sectional view taken along line 6-6 of FIG. 4.
Figure 7:
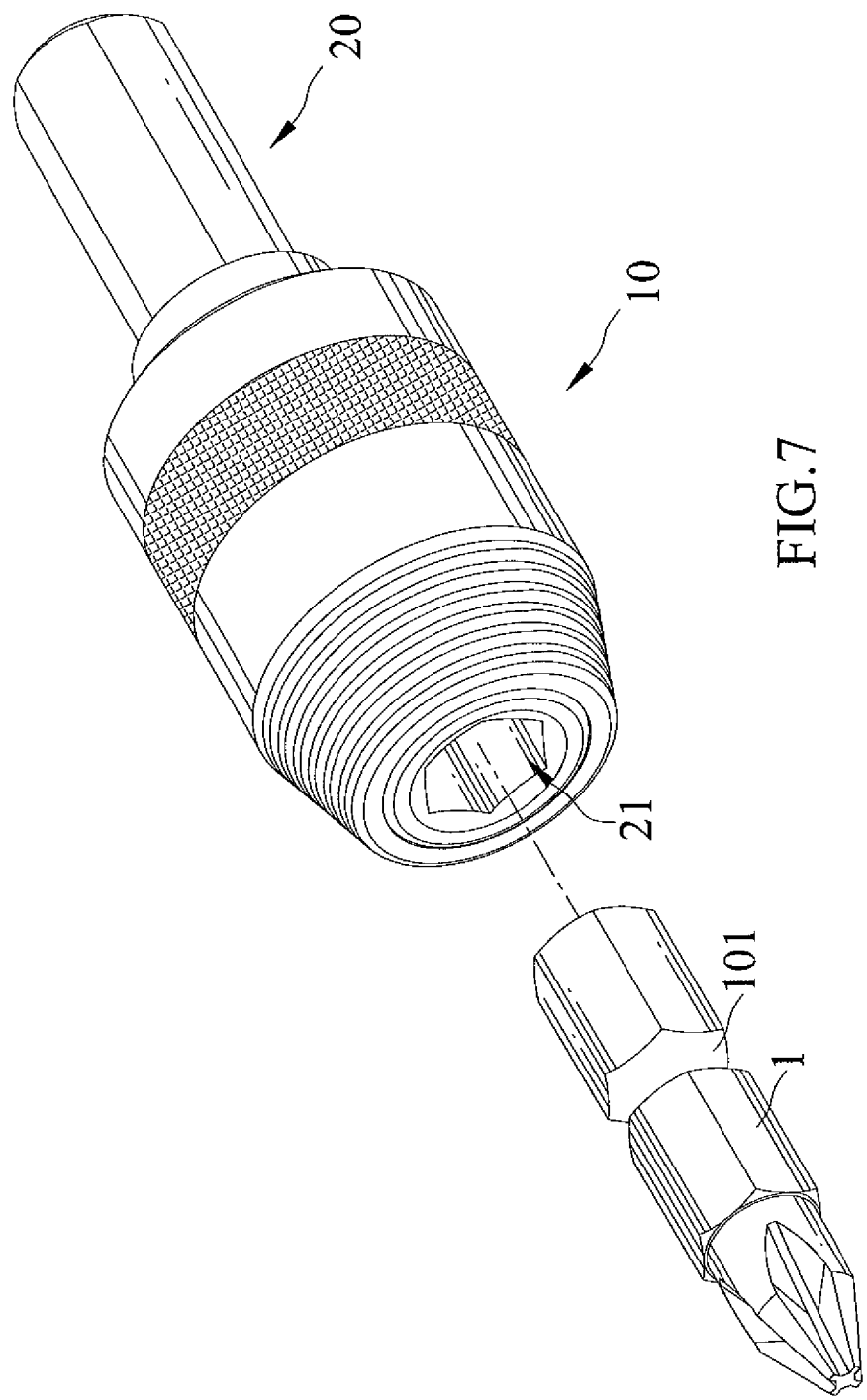
FIG. 7 is a perspective view showing the tool bit holder shown in FIG. 1 and a tool bit, with the tool bit holder adapted to releasably receive the tool bit.
Figure 8:
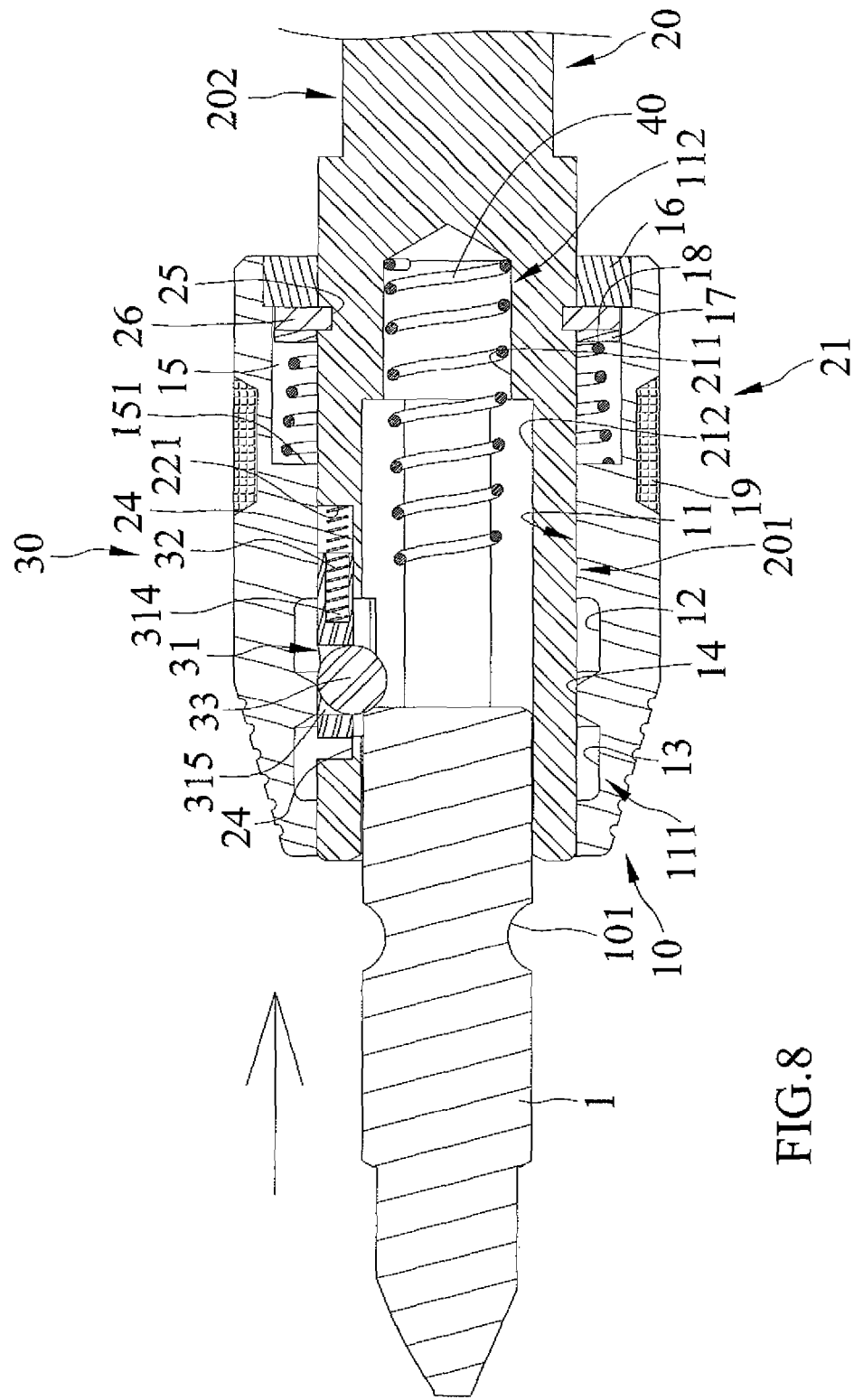
FIG. 8 is a cross-sectional view illustrating the tool bit shown in FIG. 7 being inserted into the tool bit holder shown in FIG. 1.
Figure 9:
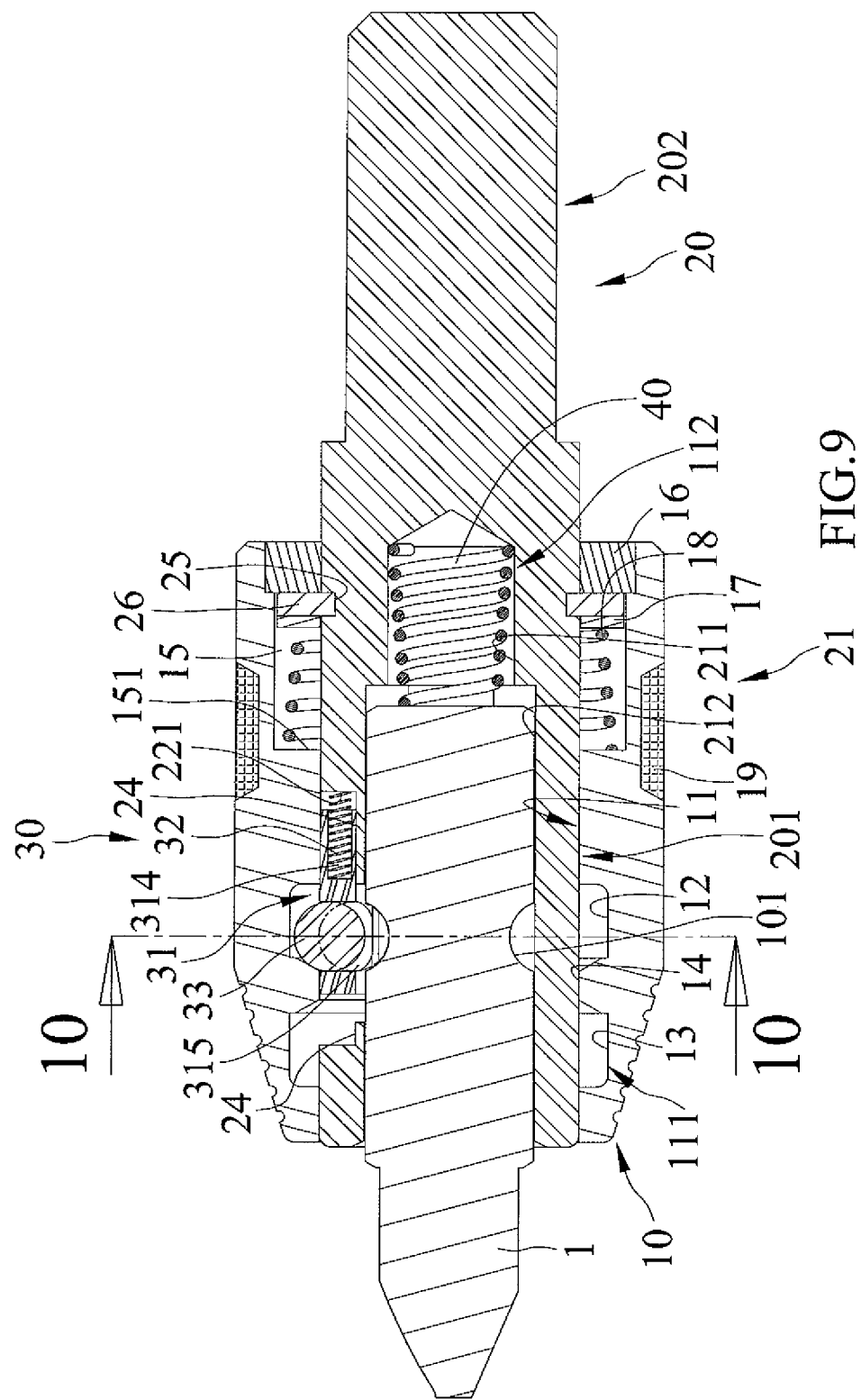
FIG. 9 is a continued cross-sectional view of FIG. 8 and shows the tool bit being further inserted into the tool bit holder.
Figure 10:
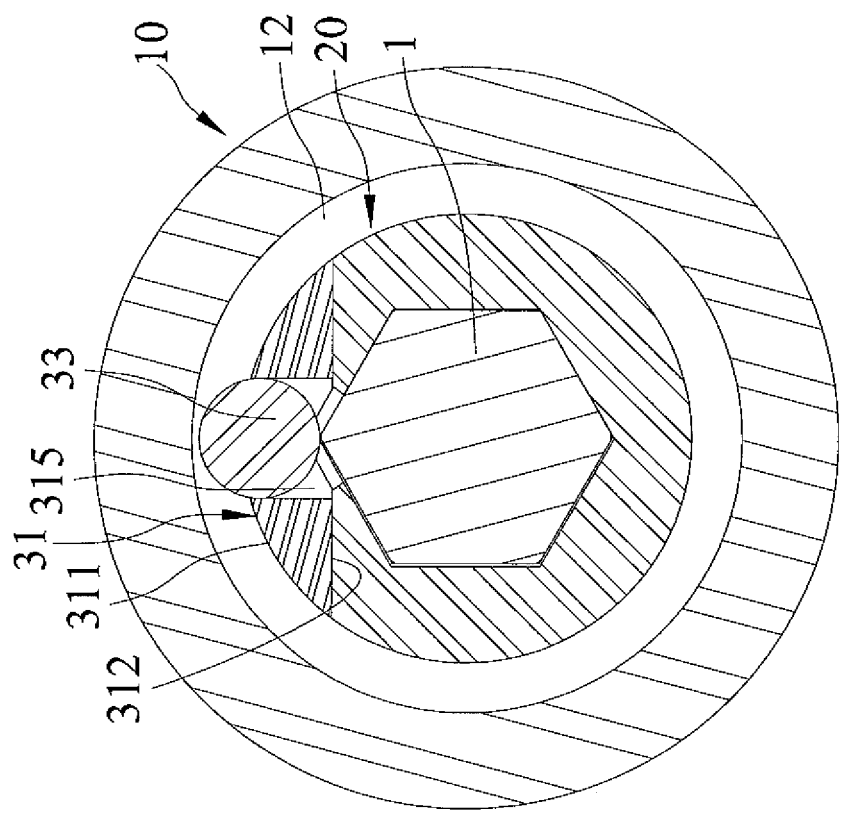
FIG. 10 is a cross-sectional view taken along line 10-10 of FIG. 9.
Figure 11:
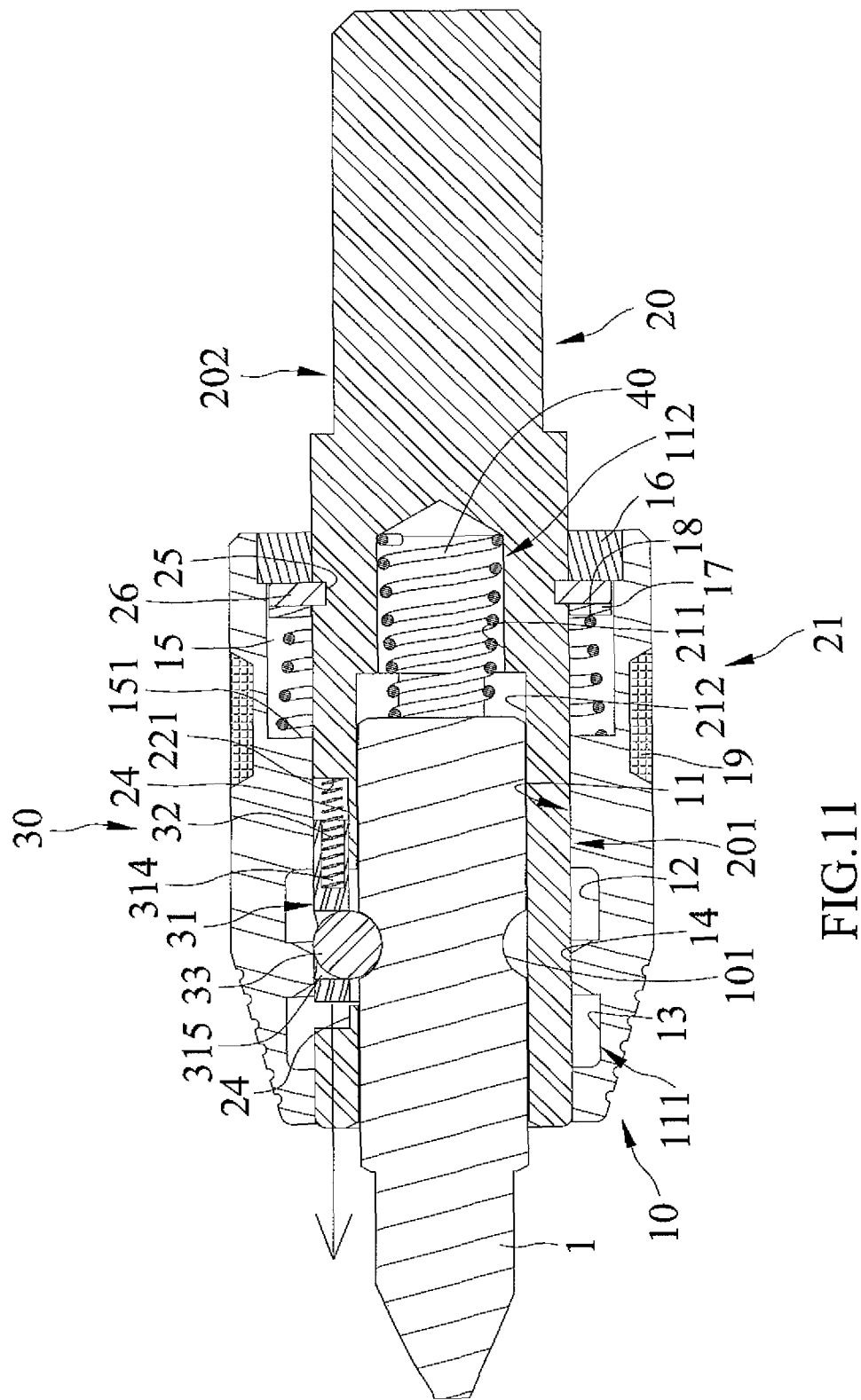
FIG. 11 is a continued cross-sectional view of FIG. 9 and shows a detent of the tool bit holder being urged into a circumferential groove of the tool bit.
Figure 12:
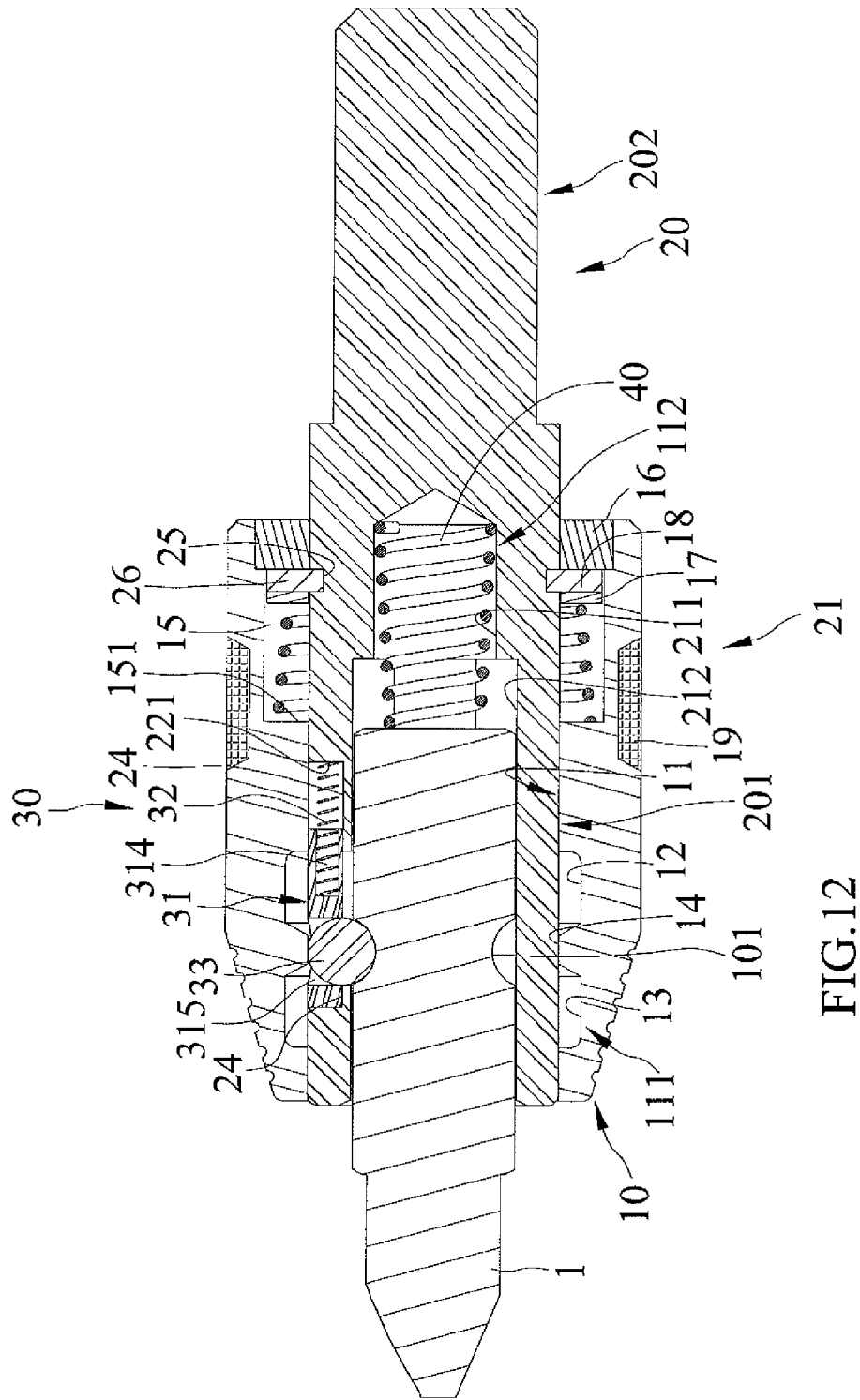
FIG. 12 is a continued cross-sectional view of FIG. 11 and shows the tool bit secured in the tool bit holder.
Figure 13:
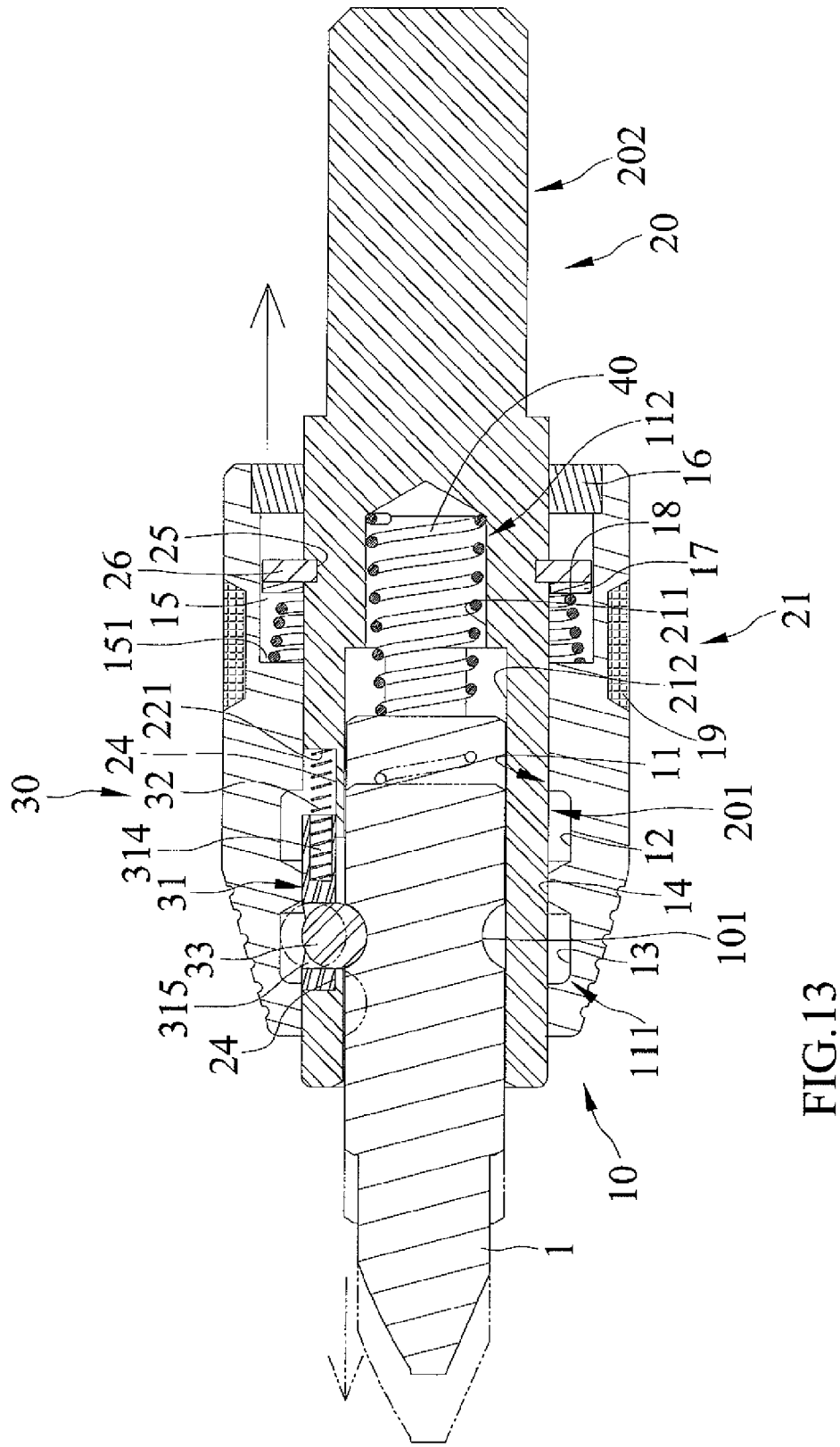
FIG. 13 is an extended cross-sectional view of FIG. 12 and shows the operation of releasing the tool bit from the tool bit holder.

As shown in FIG. 4, the sleeve 10 is biasably moved by a resilient member 18. The resilient member 18 is disposed on the hub 20 and, in particular, on the first body 201 thereof and circumferentially surrounds the outer periphery thereof. Also, the resilient member 18 is received and retained in the compartment 15 of the sleeve 10 and includes one of two ends abutted against the terminal end 151 thereof. A stop member 16 is received in the compartment 15, disposed adjacent to the second open end of the sleeve 10 and includes an outer peripheral edge engaged with the inner periphery of the sleeve 10 and an inner peripheral edge engaged with the outer periphery of the hub 20. Additionally, a gasket 17 and a clip 26 are received in the compartment 15 and are disposed further away from the second open end of the sleeve 10 than the stop member 16 such that the gasket 17 and the clip 26 are adapted to be prevented from disengagement from the compartment 15. Also, the clip 26 is engaged in the groove 25. Additionally, the resilient member 18 includes the other of the two ends abutted against the gasket 17.

The locking mechanism 30 is disposed in the cavity 22 of the hub 20 and includes a control member 31, a resilient member 32, and a detent 33. The control member 31 is moveably disposed in the cavity 22 and is biased by the resilient member 32. Additionally, the detent 33 is carried by the control member 31.

The control member 31 includes an upper side 311, and a lower side 312 opposite to the upper side 311. Also, the control member 31 includes a first pair of opposite lateral sides and a second pair of opposite lateral sides extending between the upper and lower sides 311 and 312 thereof. The first pair of opposite lateral sides faces the two stopping edges 221 of the cavity 22, respectively. The second pair of opposite lateral sides is aligned with the two lateral edges of the cavity 22, respectively. Moreover, the control member 31 includes a guiding channel 313 defined in the lower side 312 thereof, a recess 314 defined in one of the first pair of lateral sides thereof, and an aperture 315 extending therethrough from the upper side 311 to the lower side 312 thereof. The guiding channel 313 is V-shaped includes two sloped surfaces angled with each other and an apex defined at a connection of the two sloped surfaces. Additionally, the guiding edge 24 in the cavity 22 of the hub 20 is engaged in the guiding channel 313, with the apex of the guiding edge 24 abutted against the apex of the guiding channel 313, and with the two sloped surfaces of the guiding edge 24 abutted against the two sloped surfaces of the guiding channel 313, respectively. Consequently, the control member 31 is adapted to move in a predetermined path in the cavity 22 of the hub 20. Since the apex of the guiding edge 24 abuts against the apex of the guiding channel 313, the control member 31 is not liable to deviate from the path. The recess 314 receives one of two ends of the resilient member 32. Additionally, the resilient member 32 includes the other of the two ends abutted against one of the two stopping edges 221 of the cavity 22. The aperture 315 receives the detent 33. Additionally, the abutting section 14 of the sleeve 10 abuts against the detent 33 and causes it to partially expose in the bore 21 of the hub 20 and, in particular, in the first section 211 thereof.

Furthermore, the control member 31 is flush with the outer periphery of the hub 20. Consequently, the upper side 311 of the control member 31 is not extended outside a perimeter of the cavity 22 of the hub 20. Since the cross section of the first body 201 of the hub 20 is circular, the upper side 311 is of an arcuate shape that flushes with the outer periphery of the hub 20.

The tool bit holder further includes a resilient member 40 engaged and retained in the bore 21 of the hub 20. The resilient member 40 has two opposing ends including a first end and a second end, with the first end being fixed and the second end being free of any structural restrains. Also, the first end is disposed in the second section 212 of the bore 21, and the second end is disposed in the first section 211 of the bore 21, respectively.

In use of the tool bit holder to engage with the tool bit 1, the first step is inserting the tool bit 1 into the bore 21 of the hub 20. As the tool bit 1 is being inserted, it would urge the detent 33 and cause the control member 31 to carry the detent 33 in a first direction. Additionally, the resilient member 32 is depressed by the control member 31, and the resilient member 40 is depressed by the tool bit 1, respectively. Then, the detent 33 is disengaged from the abutting section 14 and urged into the first notch 12 of the sleeve 10. In this instance, the detent 33 is not exposed in the bore 21. Next, the control member 31 is biased by the resilient member in a second direction opposite to the first direction and urges the detent 33 to partially expose in the bore 21 and to engage in an engaging recess 101 defined in an outer periphery of the tool bit 1. Additionally, the detent 33 is urged to abut against the abutting section 14 of the sleeve 10 so that it is prevented from disengagement from the engaging recess 101 of the tool bit 1. Consequently, the tool bit 1 is secured in the bore 21 of the tool bit holder. In order to release the tool bit 1 from the tool bit holder, the sleeve 10 is moved with respect to the hub 20. Then, the detent 33 is disengaged from the abutting section 14 and urged into the second notch 13 of the sleeve 10. In this instance, the detent 33 is not exposed in the bore 21 and is disengaged from the engaging recess 101 of the tool bit 1. Additionally, the hub 20 is able to be connected to a hand-operated tool or a power tool.

Figure 14:
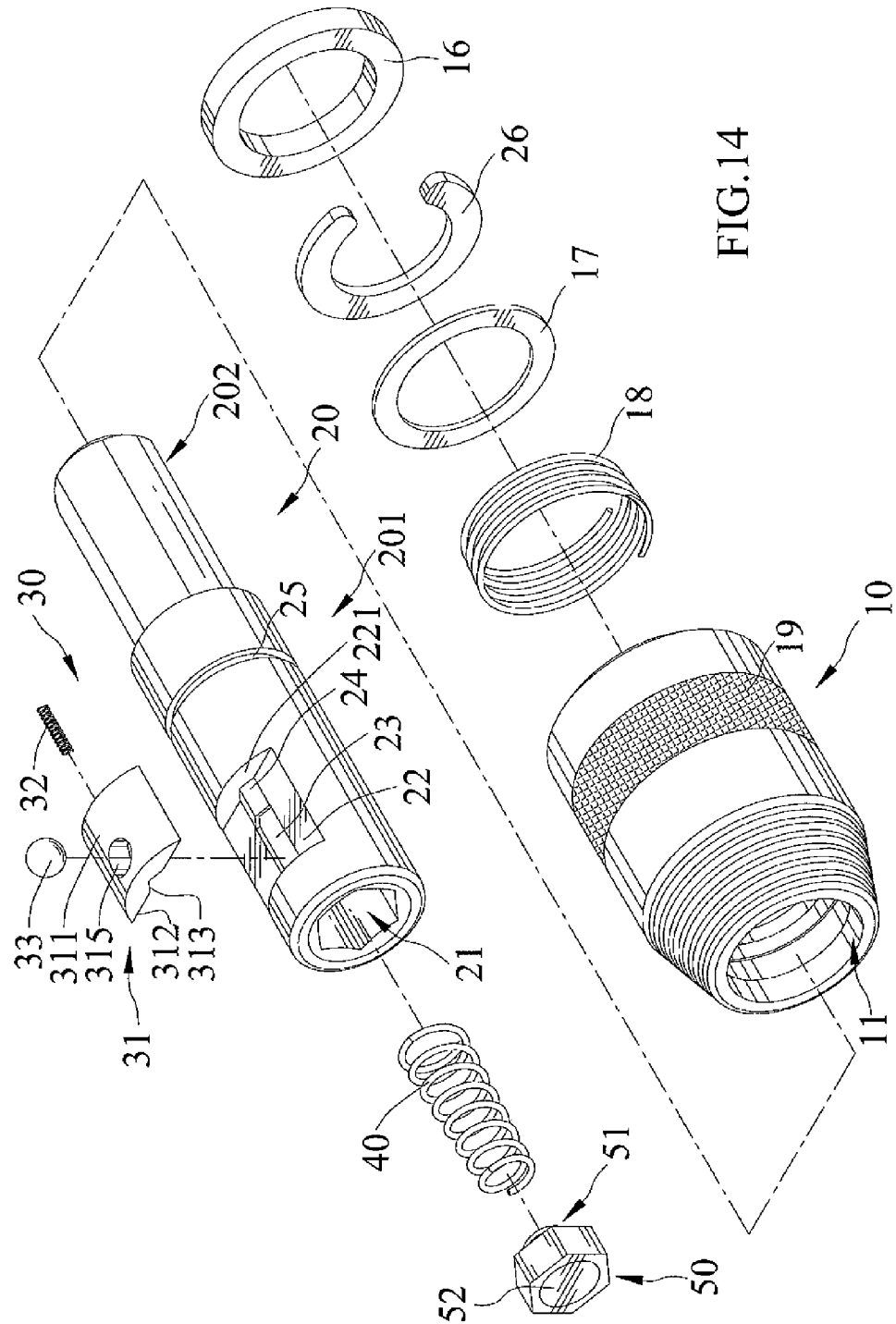
FIG. 14 is an exploded perspective view of a tool bit holder in accordance with a second embodiment of the present invention.
Figure 15:
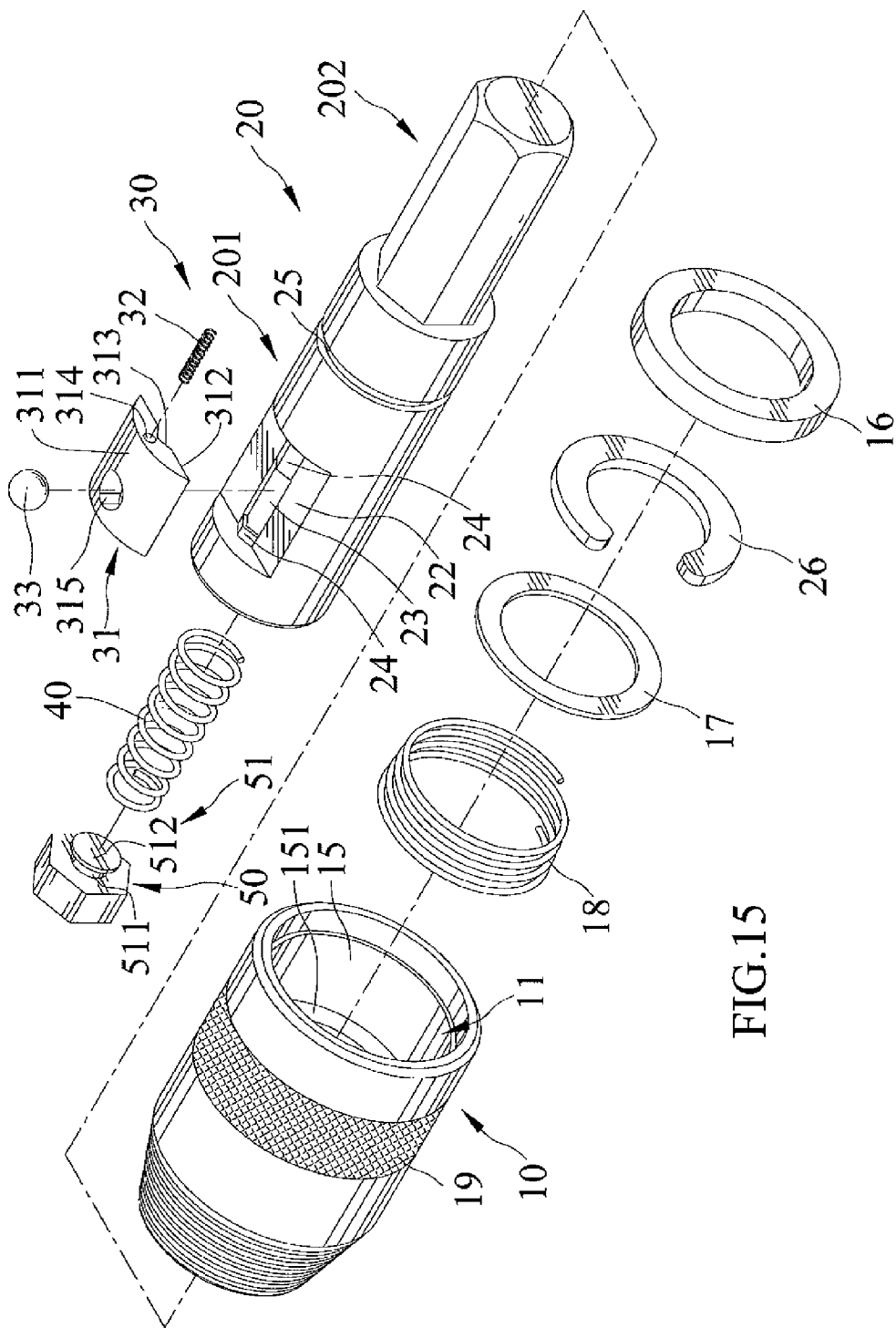
FIG. 15 is another exploded perspective view of the tool bit holder shown in FIG. 14.
Figure 16:
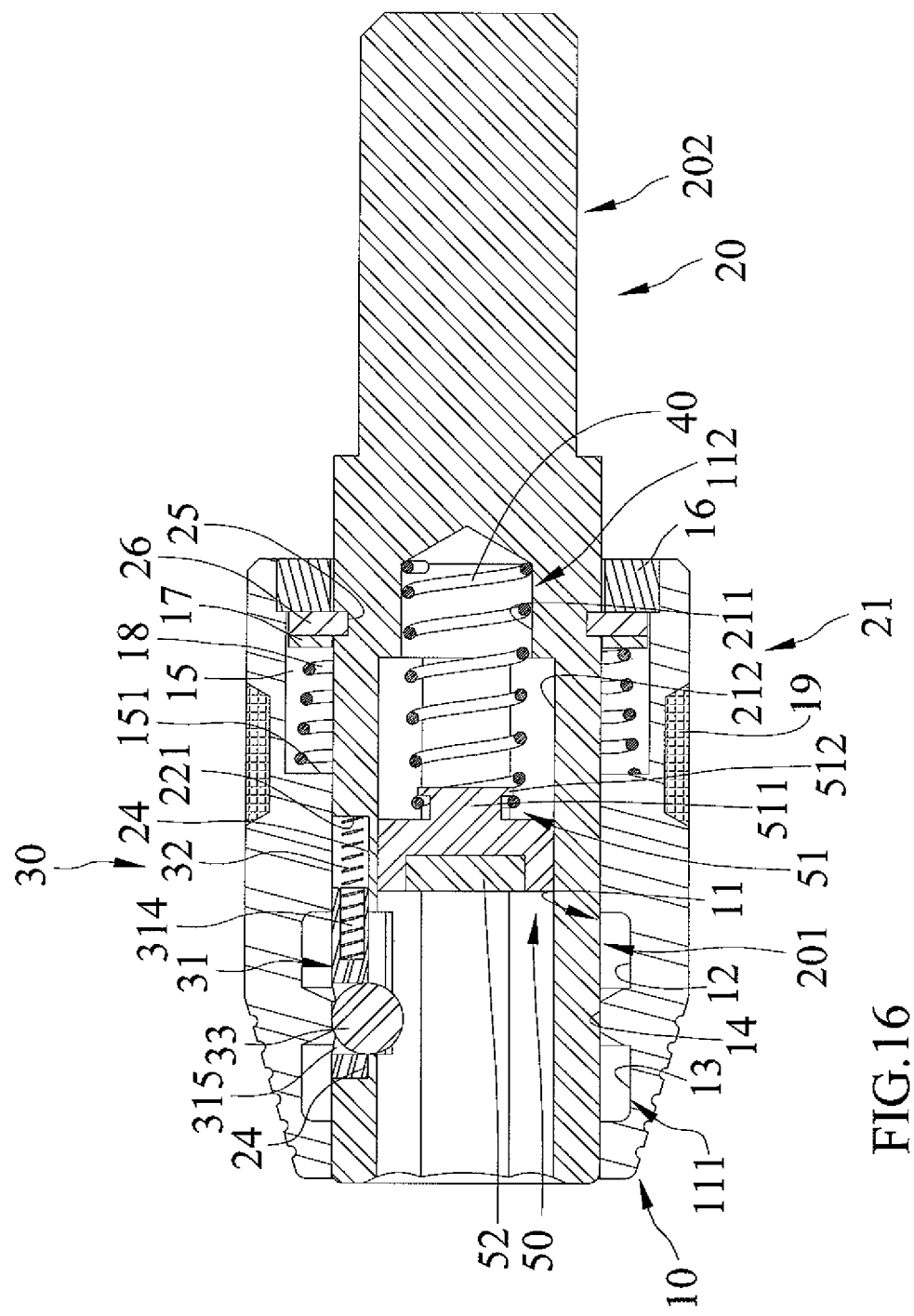
FIG. 16 is a cross-sectional view of the tool bit holder shown in FIG. 14.

FIGS. 14 and 16 show a tool bit holder in accordance with a second embodiment of the present invention. The second embodiment differentiates from the first embodiment in that it includes a pusher 50 disposed in the first section 211 of the bore 21 and engaged with the second end of the resilient member 40. Consequently, it is the pusher 50 that is able to contact with the tool bit 1 rather than the second end of the resilient member 40. The pusher 50 includes an engaging end 51 for engaging with the resilient member 40. The engaging end 51 includes a column 511 and a flange 512 connected to an end of the column 511. The flange 512 has a larger cross section than that of the column 511 for preventing the pusher 50 from disengaging from the resilient member 40. Further, a magnet 52 is mounted on the pusher 50 and is disposed opposite to the resilient member 40 for attracting the tool bit 1. Consequently, the magnet 52 can magnetically attract the tool bit 1 and enable it to be held thereto before being disengaged therefrom.

In view of the forgoing, the tool bit holder has a simple structure and components which can be assembled easily for the purpose of saving time and cost. The detent 33 is adapted to be carried by the control member 31 to engage in the either the first notch 12 or the second notches 13 and to engage in the engaging recess 101 of the tool bit 1 for securing the tool bit 1 in the tool bit holder. Moreover, the tool bit holder can secure and release the tool bit 1 quickly.

While the specific embodiments have been illustrated and described, numerous modifications come to mind without significantly departing from the spirit of invention, and the scope of invention is only limited by the scope of the accompanying claims.

What is claimed is:

1. A tool bit holder for receiving a tool bit, with the tool bit including an engaging recess, comprising:
a sleeve including a hole extending therethrough, with the hole delimited by an inner periphery thereof, the sleeve further including a first notch, a second notch, and an abutting section extending on the inner periphery, with the abutting section disposed between the first and second notches;
a hub receiving the sleeve, with the sleeve moveably mounted on an outer periphery of the hub, the hub further including a bore extending therein, a cavity defined in the outer periphery thereof, a passage extending from the bore to the cavity to enable the bore and the cavity to communicate with each other, and a guiding edge defined on the cavity; and
a locking mechanism disposed and retained in the cavity by the sleeve, the locking mechanism including a control member, a first resilient member, and a detent, with the control member moveably disposed in the cavity and biased by the resilient member, with the detent carried by the control member, with the abutting section movable relative to the hub and the control member and abutting against the detent and causing the detent to partially expose in the bore; and wherein when in use of the tool bit holder to engage with the tool bit, the detent is urged by the tool bit and the control member is caused to move and carry the detent in a first direction, and the detent is disengaged from the abutting section and urged into the first notch of the sleeve thereafter, and the control member is biased in a second direction and urges the detent to engage in the engaging recess of the tool bit thereafter for securing the tool bit; and wherein, in order to release the tool bit, the sleeve is moved with respect to the hub, and the detent is disengaged from the abutting section and urged into the second notch of the sleeve thereafter.

2. The tool bit holder as claimed in claims 1 further comprising a pusher disposed in the bore and engaged with the second end of the first resilient member, wherein the pusher includes a magnet mounted thereon and disposed opposite to the first resilient member for attracting the tool bit.

3. The tool bit holder as claimed in claim 1 further comprising a second resilient member engaged and retained in the bore of the hub, the second resilient member includes two opposing ends including a first end and a second end, with the first end being fixed and the second end being free of any structural restrains, with the second end adapted to contact the tool bit.

4. The tool bit holder as claimed in claims 3 further comprising a pusher disposed in the bore and engaged with the second end of the first resilient member, wherein the pusher includes a magnet mounted thereon and disposed opposite to the first resilient member for attracting the tool bit.

5. The tool bit holder as claimed in claim 1, wherein the control member is flush with the outer periphery of the hub.

6. The tool bit holder as claimed in claim 5 further comprising a second resilient member engaged and retained in the bore of the hub, the second resilient member includes two opposing ends including a first end and a second end, with the first end being fixed and the second end being free of any structural restrains, with the second end adapted to contact the tool bit.

7. The tool bit holder as claimed in claims 5 further comprising a pusher disposed in the bore and engaged with the second end of the first resilient member, wherein the pusher includes a magnet mounted thereon and disposed opposite to the first resilient member for attracting the tool bit.

8. The tool bit holder as claimed in claim 1, wherein the control member includes an upper side, a lower side opposite to the upper side and a lateral side extending between the upper and lower sides, the control member further includes a guiding channel defined in the lower side, a recess defined in the lateral side, and an aperture extending therethrough from the upper side to the lower side, with the recess receiving one of two ends of the first resilient member, and with the aperture receiving the detent.

9. The tool bit holder as claimed in claims 8 further comprising a pusher disposed in the bore and engaged with the second end of the first resilient member, wherein the pusher includes a magnet mounted thereon and disposed opposite to the first resilient member for attracting the tool bit.

10. The tool bit holder as claimed in claim 8 further comprising a second resilient member engaged and retained in the bore of the hub, the second resilient member includes two opposing ends including a first end and a second end, with the first end being fixed and the second end being free of any structural restrains, with the second end adapted to contact the tool bit.

11. The tool bit holder as claimed in claims 10 further comprising a pusher disposed in the bore and engaged with the second end of the first resilient member, wherein the pusher includes a magnet mounted thereon and disposed opposite to the first resilient member for attracting the tool bit.

12. The tool bit holder as claimed in claim 8, wherein the control member is flush with the outer periphery of the hub.

13. The tool bit holder as claimed in claim 12 further comprising a second resilient member engaged and retained in the bore of the hub, the second resilient member includes two opposing ends including a first end and a second end, with the first end being fixed and the second end being free of any structural restrains, with the second end adapted to contact the tool bit.

14. The tool bit holder as claimed in claims 12 further comprising a pusher disposed in the bore and engaged with the second end of the first resilient member, wherein the pusher includes a magnet mounted thereon and disposed opposite to the first resilient member for attracting the tool bit.

15. A tool bit holder for receiving a tool bit, with the tool bit including an engaging recess, comprising:
- a sleeve including a hole extending therethrough, with the hole delimited by an inner periphery thereof, the sleeve further including a first notch, a second notch, and an abutting section extending on the inner periphery, with the abutting section disposed between the first and second notches;
- a hub receiving the sleeve, with the sleeve moveably mounted on an outer periphery of the hub, the hub further including a bore extending therein, a cavity defined in the outer periphery thereof, a passage extending from the bore to the cavity to enable the bore and the cavity to communicate with each other, and a guiding edge defined on the cavity; and
- a locking mechanism disposed and retained in the cavity by the sleeve, the locking mechanism including a control member, a first resilient member, and a detent, with the control member moveably disposed in the cavity and biased by the resilient member, with the detent carried by the control member, with the abutting section abutting against the detent and causing detent to at expose in the bore;
- wherein when in use of the tool bit holder to engage with the tool bit, the detent is urged by the tool bit and the control member is caused to move and carry the detent in a first direction, and the detent is disengaged from the abutting section and urged into the first notch of the sleeve thereafter, and the control member is biased in a second direction and urges the detent to engage in the engaging recess of the tool bit thereafter for securing the tool bit;
- wherein, in order to release the tool bit, the sleeve is moved with respect to the hub, and the detent is disengaged from the abutting section and urged into the second notch of the sleeve thereafter;
- wherein the control member includes an upper side, a lower side opposite to the upper side and a lateral side extending between the upper and lower sides, the control member further includes a guiding channel defined in the lower side, a recess defined in the lateral side, and an aperture extending therethrough from the upper side to the lower side, with the recess receiving one of two ends of the first resilient member, and with the aperture receiving the detent; and
- wherein the guiding edge and guiding channel are V-shaped and include two sloped surfaces angled with each other and an apex defined at a connection of the two sloped surfaces, with the apex of the guiding edge abutted against the apex of the guiding channel, and with the two sloped surfaces of the guiding edge abutted against the two sloped surfaces of the guiding channel, respectively.

16. The tool bit holder as claimed in claim 15 further comprising a second resilient member engaged and retained in the bore of the hub, the second resilient member includes two opposing ends including a first end and a second end, with the first end being fixed and the second end being free of any structural restrains, with the second end adapted to contact the tool bit.

17. The tool bit holder as claimed in claims 15 further comprising a pusher disposed in the bore and engaged with the second end of the first resilient member, wherein the pusher includes a magnet mounted thereon and disposed opposite to the first resilient member for attracting the tool bit.

18. The tool bit holder as claimed in claim 15, wherein the control member is flush with the outer periphery of the hub.

19. The tool bit holder as claimed in claim 18 further comprising a second resilient member engaged and retained in the bore of the hub, the second resilient member includes two opposing ends including a first end and a second end, with the first end being fixed and the second end being free of any structural restrains, with the second end adapted to contact the tool bit.

20. The tool bit holder as claimed in claims 18 further comprising a pusher disposed in the bore and engaged with the second end of the first resilient member, wherein the pusher includes a magnet mounted thereon and disposed opposite to the first resilient member for attracting the tool bit.

* * * * *